US009880810B1

(12) United States Patent
Heine et al.

(10) Patent No.: US 9,880,810 B1
(45) Date of Patent: Jan. 30, 2018

(54) UNIVERSAL SHIFTER AND ROTATOR AND METHODS FOR IMPLEMENTING A UNIVERSAL SHIFTER AND ROTATOR

(71) Applicant: Cadence Design Systems, Inc., San Jose, CA (US)

(72) Inventors: David L. Heine, Mountain View, CA (US); Aamir A. Farooqui, Mountain View, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 256 days.

(21) Appl. No.: 14/503,402

(22) Filed: Oct. 1, 2014

(51) Int. Cl.
*G06F 5/01* (2006.01)
(52) U.S. Cl.
CPC ..................................... *G06F 5/01* (2013.01)
(58) Field of Classification Search
None
See application file for complete search history.

(56) References Cited

U.S. PATENT DOCUMENTS

| 5,652,718 A * | 7/1997 | Thomson | G06F 5/015 |
| | | | 377/67 |
| 2010/0306291 A1* | 12/2010 | Craske | G06F 5/00 |
| | | | 708/209 |
| 2016/0092166 A1* | 3/2016 | Gschwind | G06F 5/01 |
| | | | 708/209 |

OTHER PUBLICATIONS

Thomas, Donald, and Philip Moorby. The Verilog® Hardware Description Language. Springer Science & Business Media, 2002, pp. 35-71.
"Arithmetic shift", Wikipedia, URL: http://en.wikipedia.org/wiki/Arthmetic_shift, Accessed on Jul. 11, 2014.
Devices, Analog. ADSP-BF535 Blackfin Processor Hardware Reference, Revision 2.0. Analog Devices, Mar. 2012.
"Chapter 3: Verilog Syntax Details", URL: http://www.verilogtutorial.info/chapter_3.htm, Accessed on Sep. 2, 2014.
Zimmermann, Reto. "Datapath Synthesis for Standard-Cell Design." IEEE Symposium on Computer Arithmetic. 2009.
Rowen, C. et al., "The World's Fastest DSP Core: Breaking the 100 GMAC/s Barrier", Hot Chips 23—Aug. 2011.
Hilewitz, Yedidya, and Ruby B. Lee. "A new basis for shifters in general-purpose processors for existing and advanced bit manipulations." IEEE Transactions on computers 58.8 (2009): 1035-1048.

(Continued)

*Primary Examiner* — David H Malzahn
(74) *Attorney, Agent, or Firm* — Vista IP Law Group, LLP

(57) ABSTRACT

A single block shifter design performing arithmetic and logical shift operations on input operands of multiple types is disclosed. The shifter design may be configurable and automatically generated to support multiple partition types including at least one of 80-bit, 40-bit, and 20-bit partition type. The shifter may also be configured and automatically generated to perform rotate operations on input operands. The shifter may include two stages where the first stage includes multiple multiplexers performing shift or rotate operations by one or more shift or rotate amounts without saturation, and the second stage includes multiple multiplexers performing operations with saturation. The shifter includes an inversion block to process signed and unsigned input data. A method of automatically generating the shifter design with an electronic design tool is also disclosed.

28 Claims, 17 Drawing Sheets

(56) References Cited

OTHER PUBLICATIONS

Kumar, Rajeev, and Anil Vohra. "Design of Variable Width Barrel Shifter for High Speed Processor Architecture." International Journal of Engineering Science and Technology 4.4 (2012).
Pillmeier, Matthew R., Michael J. Schulte, and Eugene G. Walters III. "Design alternatives for barrel shifters." International symposium on optical science and technology. International Society for Optics and Photonics, 2002.
"Arm Compiler armasm Reference Guide Version 6.00", URL: http://infocenter.arm.com/help/topic/com.arm.doc.dui0802a/ CIHGHGAB.html, Accessed on Jul. 11, 2014.

* cited by examiner

UNIVERSAL SHIFTER AND ROTATOR AND METHODS FOR IMPLEMENTING A UNIVERSAL SHIFTER AND ROTATOR

BACKGROUND

Shifters are often used in digital signal processors and general-purpose processors to shift or rotate data in applications including arithmetic operations, variable-length coding, bit-indexing, etc. Shifting and rotating operations performed by a shifter may include, for example, shift right arithmetic, shift left arithmetic, shift right logical, shift left logical, rotate right, and rotate left to shift and/or rotate input data or operands. A shifter performs a shifting or rotating operation by a certain amount (a shift amount or rotate amount) on input data. A shifter is often implemented with a series of multiplexers grouped according to the levels of shift operations. A shift (or rotate) amount for an n-bit input includes a $\log_2(n)$-bit integer that represents values from 0 to n−1, and each bit in the shift (or rotate) amount controls a different stage of the shifter. The data into the m-th stage controlled by, for example, a shift amount b(m) is shifted by $2^m$ bits if the bit value b(m) is one (1); otherwise, the data is not shifted.

SIMD (Single Instruction Multiple Data) describes a class of computers with multiple processing elements performing the same operation on multiple data points simultaneously and is often utilized in data level parallelism. Conventional synthesis electronic design automation (EDA) tools are generally tuned or configured for single operation and thus cannot combine different widths of shifters (e.g., SIMD type or Single Instruction Multiple Data types having 8-16-20-32-40-64-80-bit widths) into a single block of circuitry receiving inputs from, for example, the register file or instruction pipelines and transmitting output to, for example, ALU or arithmetic logic unit. In addition, modern EDA tools, when used to implement the shifter design, also encounter great difficulties in meeting the timing requirements and often result in a shifter design having a significant larger die area and failing to run at high frequencies (e.g., failure to run in the Giga-Hertz range).

Therefore, there exist a need for a universal shifter that performs both the shift and rotate operations with one or more amounts (e.g., one or more of 1-2-4-8-16-32-64-bit shift amounts) for input data or input operands (collectively "input data") having multiple data types or partition types (e.g., 8-16-32-64-20-40-80-bits) producing multiple outputs according to data types, in the Giga-Hertz range in a single circuit block while reducing or minimizing the die area for the single circuit block.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Some embodiments illustrated herein describe a single block shifter design performing arithmetic and logical shift operations on input operands of multiple types is disclosed. The shifter design may be configurable and automatically generated to support multiple partition types including at least one of one 80-bit, one 64-bit, two 40-bit, two 16-bit, four 8-bit, and four 20-bit partition types as well as multiple shift amounts. The shifter may also be configured and automatically generated to perform rotate operations on input operands and to support both signed and unsigned input data as well as both signed and unsigned shift amounts. The shifter may include two stages where the first stage includes multiple levels of multiplexers performing the desired or required shifting or rotating operations by one or more shift or rotate amounts without saturation, and the second stage includes multiple levels of multiplexers performing operations with saturation.

Each level of multiplexers includes a sequence of multiplexers to perform the desired or required shifting or rotating operations with its respective shift amount and rotate amount. The shifter may also include an inversion block to process signed and unsigned input data. Some embodiments describe a method for automatically generating a shifter design by using one or more electronic design tools. These embodiments may identify a specification (e.g., an HDL specification) for the shifter design, generate or identify one or more functions for one or more compilers, and use the one or more compilers either alone or in conjunction with one or more other EDA tools to generate the design of a single hardware block for the shifter.

Figure 4:
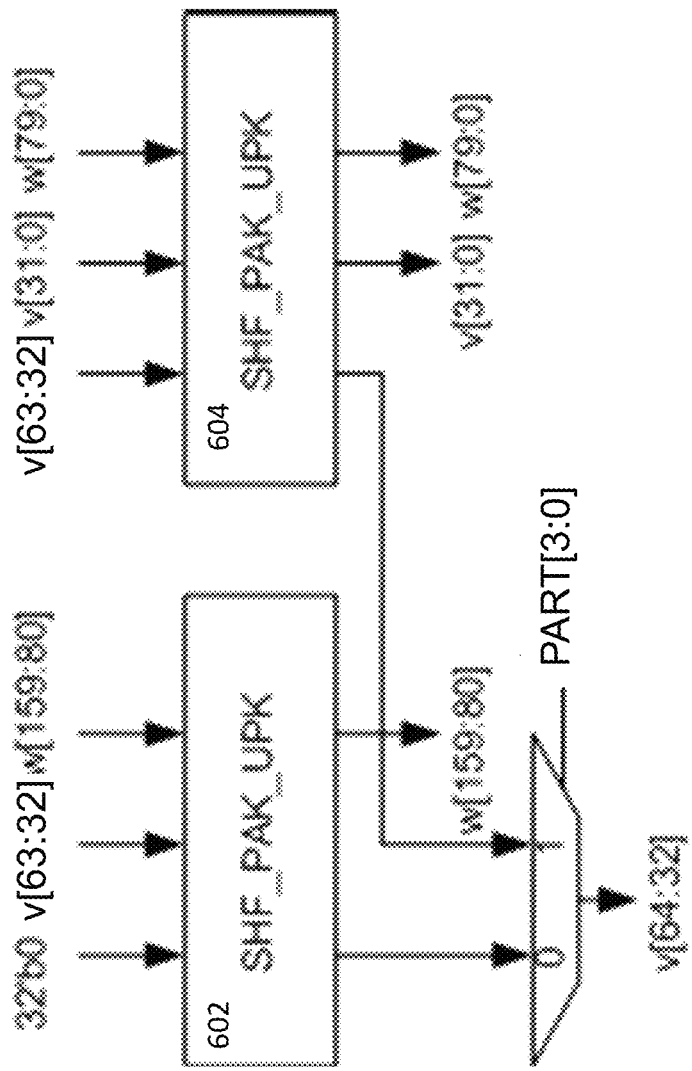
FIG. 4 illustrates another schematic shifter design in some embodiments.
Figure 5:
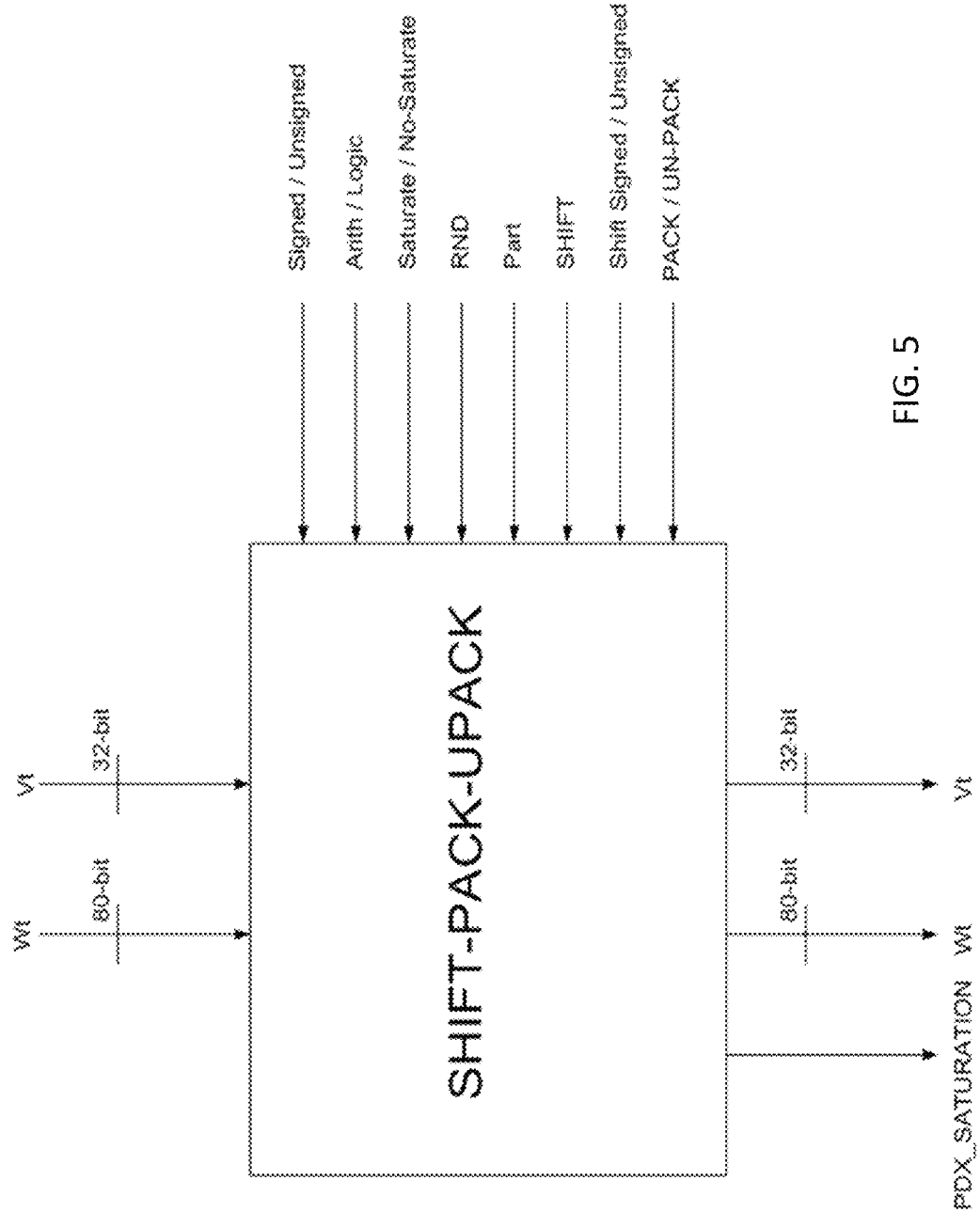
FIG. 5 illustrates a block diagram of the schematic shifter design illustrated in FIG. 4 in some embodiments.

FIG. 5 illustrates a block diagram of the schematic shifter design illustrated in FIG. 4 in some embodiments. More specifically, FIG. 5 illustrates that the shifter module may perform various operations (e.g., the shifting, rotating, packing, unpacking operations, etc.) on multiple data types. For example, the shifter module may receive 80-bit input data (e.g., "Wt" in FIG. 5) and 32-bit input data (e.g., "Vt" in FIG. 5) and perform the required or desired operations to respectively generate the 80-bit or 32-bit shifted output. FIG. 5 further illustrates that the shifter module may use various other signals in performing these operations.

These various other signals may include, for example, the "Signed/Unsigned" control signal indicating whether input shift data is signed or unsigned; the "Arith/Logic" control signal indicating whether arithmetic or logical shift operations are to be performed; the "Saturate/No-Saturate" control signal indicating whether or not signal saturation is to be performed; the "RND" control signal indicating whether or not rounding operations are to be performed; the "Part" control signal indicating the partition types; the "PACK/UN-PACK" control signal for the packing or unpacking operations; the shift amount signals ("SHIFT"); the control signal "shift signed/Unsigned" control signal indicating whether or not the shift amount is signed or unsigned, the "PDX_SATURATION" signal indicating whether or not the output is saturated, etc. The shift control signals can be four 8-bit signals for 8- or 20-bit operations, two 16-bit signals for 16- or 40-bit operations, one 32-bit signal for 32- or 80-bit operations, or 64-bit signal for 64-bit operations. However, a shifter may perform, for example, only 64-bit, 32-bit, 16-bit etc. shifts. Therefore, when a shift amount exceeds the width of one of these shift control signals, the result will be saturated.

For example, the "Shift Signed/Unsigned" signal when set to "1" indicates that the shift amount is signed negative when the most significant bit of the shift amount is high or has the value of "1", and positive when the most significant bit is low or has the value of "0". The "PDX_SATURATION", when having a value of "1" or high, indicates that the output is saturated, and that the output is not saturated when having a value of "0" or low. Unless otherwise specifically recited, control signals in various other figures are similarly or identically defined as these control signals in FIG. 5.

Figure 6:
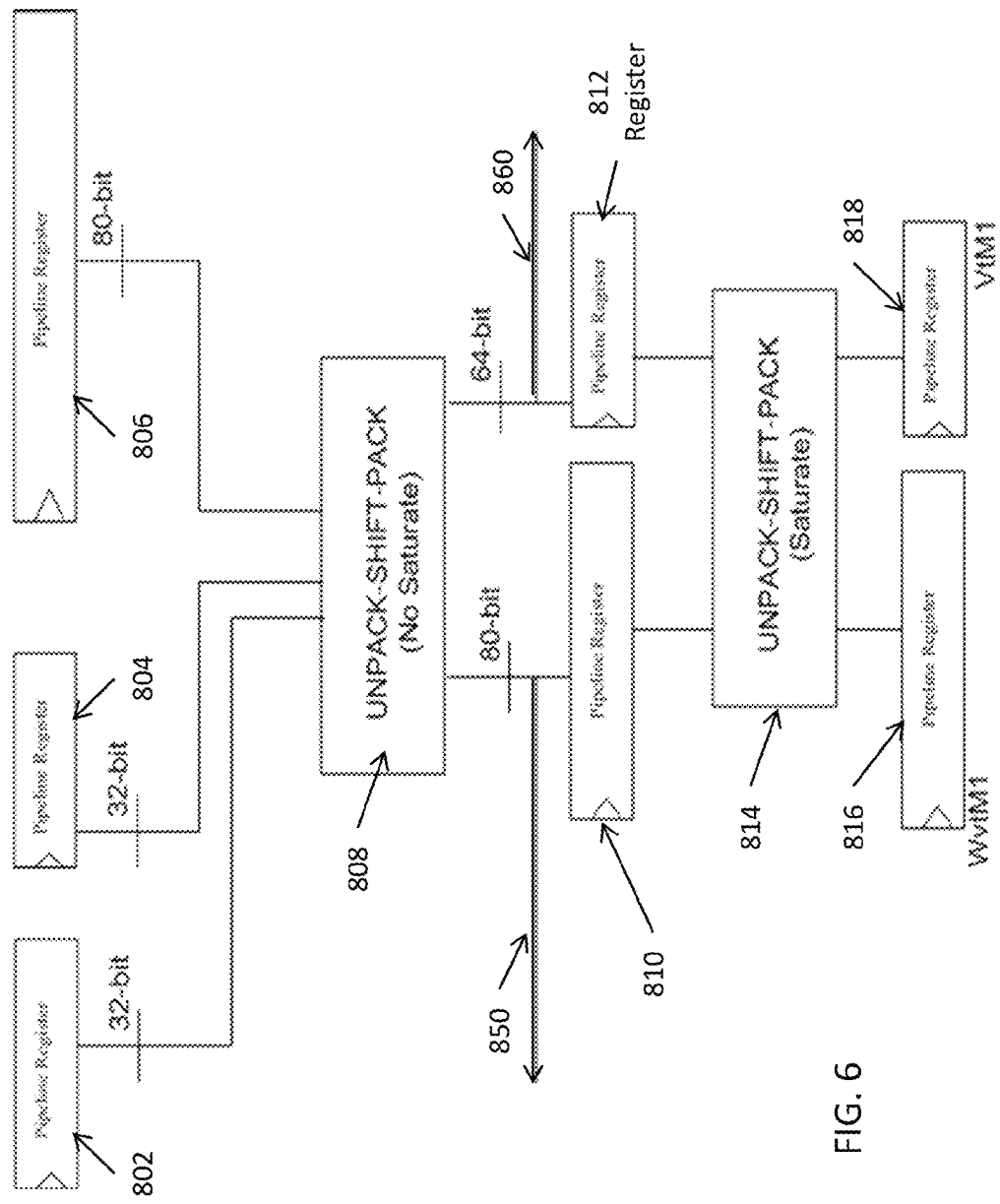
FIG. 6 illustrates a more detailed schematic design of a two-stage shifter in some embodiments.

FIG. 6 illustrates a more detailed schematic design of a two-stage shifter in some embodiments. In these embodiments, the shifter includes a shifter module 808 that receives 32-bit input data from pipeline registers 802 and 804 and 80-bit input data from pipeline register 806. The shifter module 808 may perform various packing, unpacking, shifting, and rotating operations on the input data with no signal saturation (e.g., when the "saturate/no saturate" from an instruction is low) to generate and transmit 64-bit shifted output to pipeline register 812 and 80-bit shifted output to pipeline register 810.

The shifter module finishes the desired or required operations on input data, for which saturation is not performed, and transmits the 64-bit and 80-bit shift output through 850 and 860 respectively. If saturation is to be performed (e.g., when the "saturate/no saturate" from an instruction is high), the shifter module 808 generates and transmits the saturation shift vectors to the shifter module 814 that continues to perform the desired or required shifting, rotating, packing, and unpacking operations to generate and store the shifted output in pipeline registers 816 and 818 (e.g., 80-bit output in pipeline register 816 and 64-bit output in pipeline register 818). Moreover, the 32-bit input from the pipeline register (e.g., 802 or 804) may be transmitted into the shifting sub-module in the shifter module 808 to generate 80-bit output. In addition or in the alternative, the 32-bit input from the pipeline registers may be first transmitted into the unpacking sub-module in the shifter module 808 and then to the shifting sub-module to generate the 64-bit output in these embodiments illustrated in FIG. 6.

Figure 7:
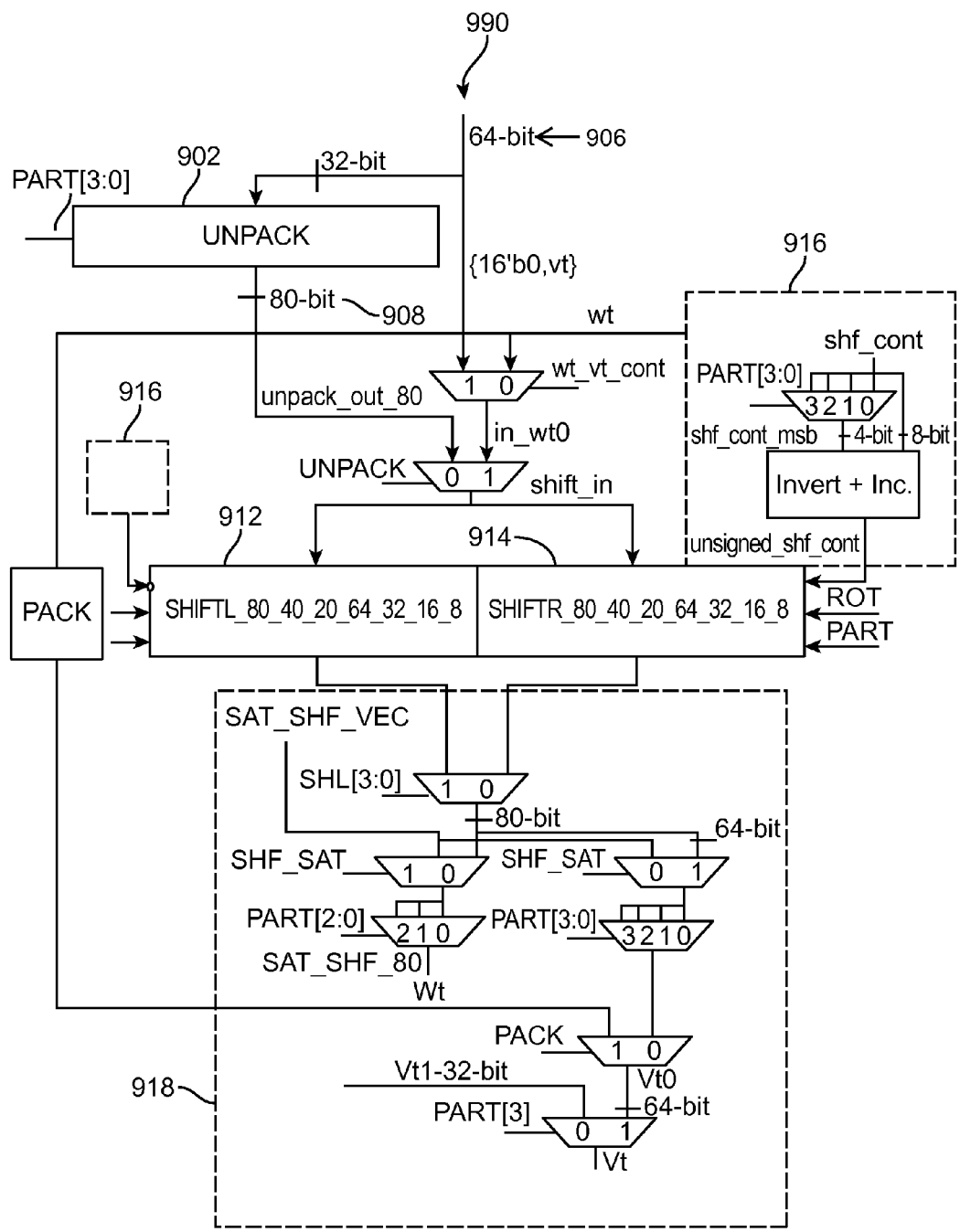
FIG. 7 illustrates a more detailed schematic design of a first stage of the shifter illustrated in FIG. 6 in some embodiments.
Figure 8:
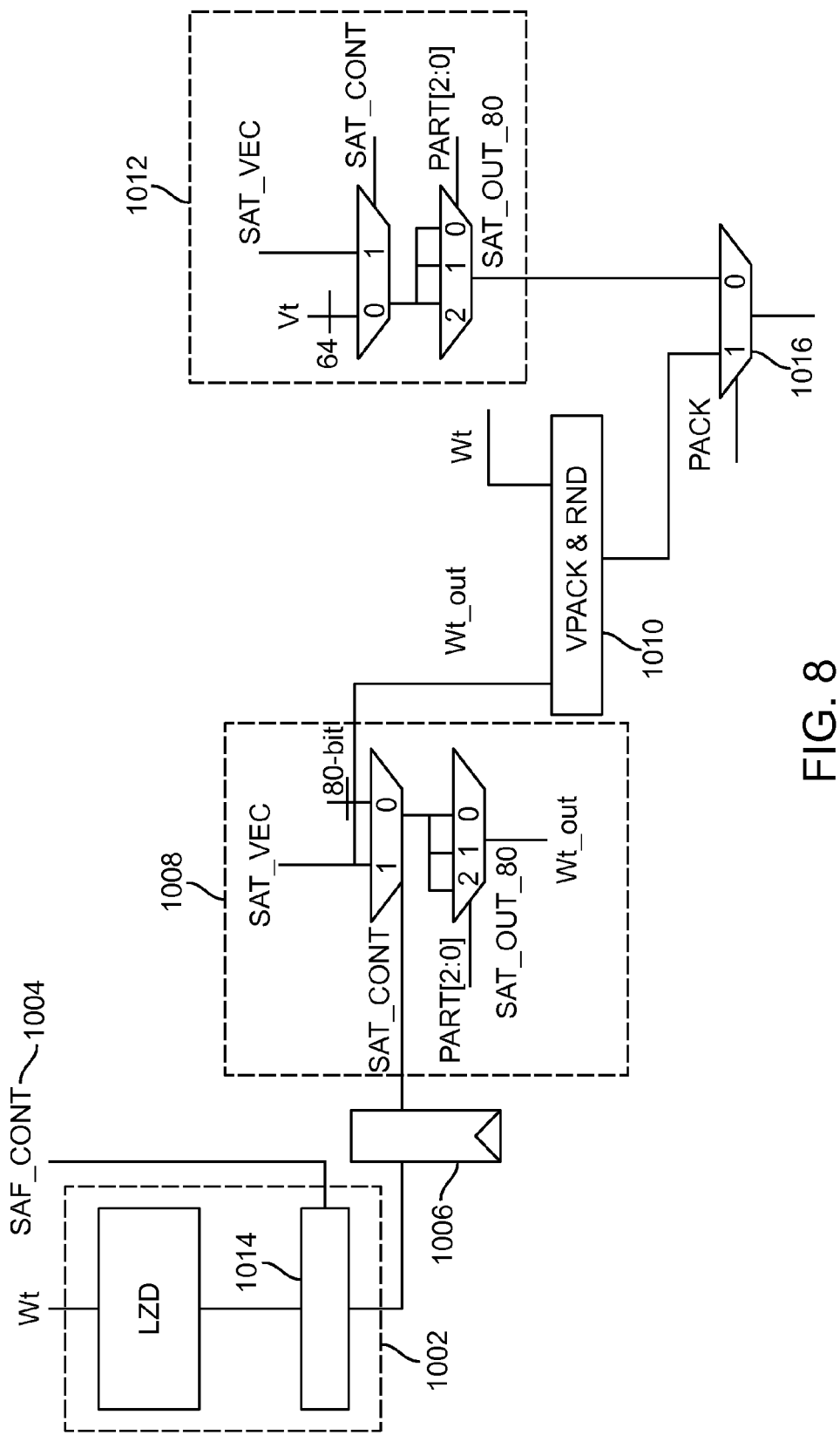
FIG. 8 illustrates a more detailed schematic design of a second stage of the shifter illustrated in FIG. 6 in some embodiments.

FIG. 7 illustrates a more detailed schematic design of a first stage of the shifter illustrated in FIG. 6 in some embodiments. More specifically, FIG. 7 illustrates more details about the first stage of the shifter illustrated in FIG. 6 (the shifter module 808) that performs desired or required unpacking, shifting, rotating, and packing operations during a first cycle without signal saturation (and which is also applicable to implement the shifter module 604 shown in FIG. 4 described in more detail below). The second stage, as illustrated in FIG. 8, illustrates the performance of operations on the input data with saturation. Whether or not input data are to be saturated and what the input data are to be saturated to may be indicated in shift instructions. When signal saturation is desired or required, the shifter completes the shifting and/or rotating operations in two clock cycles.

The first stage of the shifter design illustrated in FIG. 7 includes an unpacking module 902 that receives, for example, input data 990 from, for example, one or more pipeline registers, performs the unpacking operations to create input data 908 that are further transmitted to multiplexers for the selection of 64-bit input or unpacked 80-bit input to the shifters 914 and 912. The left shifter 912 is used for the desired or required left shift or rotate operations or the right shifter 914 is used for the desired or required right shift or rotate operations. The shifter design illustrated in FIG. 7 may further include a data gating block (not shown) that selectively enables or turns on one of the right shifter and the left shifter and disables or shuts off the other shifter according to the shift instructions to reduce power consumption. For example, if a shift instruction indicates that left shift arithmetic operations are to be performed for certain input data, the data gating block may disable or shut off the right shifter 914.

The right shifter 914 and the left shifter 912 are operatively coupled to a shift amount logic block 916. The shift amount block 916 generates and transmits the unsigned shift control signal (e.g., "unsigned_shf_cont" in FIG. 7) to the left shifter 912 or the right shifter 914 according to the shift instructions. The shift amount can be 64-bit input for 64 & 80-bit shifts, 32-bit for 32-bit shift, 16-bit for 16 & 40-bit shifts, 8-bit for 8 & 20-bit shifts, The 4-bit selection signal "PART[3:0]" indicates what partition type is to be used to process certain input data. For example, [1,0,0,0] indicates that one (1) 64-bit shift is needed; [0,1,0,0] indicates that one (1) 32-bit shift is needed; [0,0,1,0] indicates two (2) 16-bit shifts are produced; and [0,0,0,1] indicates that four (4) shift results are produced.

Each of the left shifter 912 and the right shifter 914 may include multiple levels of multiplexers, and each level includes a sequence of multiplexers that performs the shift operations with a specific shift amount. For example, the left shifter 912 (or the right shifter 914) may include a first level of multiplexers performing 1-bit shift, a second level of multiplexers performing 2-bit shift, a third level of multiplexers performing 4-bit shift, etc. The left shifter 912 and right shifter 914 may receive the partition type signals (e.g., "PART" in FIG. 7) to determine which partition type is to be used and the rotation signal (e.g., "ROT" in FIG. 7) to determine whether rotating operations are to be performed. The outputs of the left shifter 912 and the right shifter 914 are transmitted to a group of multiplexers 918 which selects the output results from the expected branches by using at least partition type signals (e.g., PART[2:0] for selecting the output from the expected branches of 20-40-80-bit shifter modules and PART[3:0] for selecting the output from the expected branches of 8-16-32-64-bit shifter modules). It shall be noted that a smaller box 916 is duplicated on the left-hand side of FIG. 7 to indicate that the inversion block is operatively coupled to both the left shifter 912 and the right shifter 914.

FIG. 8 illustrates a more detailed schematic design of a saturate logic of the shifter illustrated in FIG. 6 in some embodiments. More specifically, FIG. 8 illustrates the operations performed by the shifter illustrated in FIG. 6 during the saturate operation in some embodiments. The first stage of the saturate logic includes a leading zero detection module 1002 that identifies the leading zero(es) of the input data and determines whether the shift control 1004 (e.g., the "shf_cont" or "shift control" or the "unsigned_shf_cont" or "unsigned shift control" in 916 of FIG. 9) is equal to the leading zero detection result by using the determination block 1014 that determines whether the shift amount is within a permissible limit or threshold.

The determination results may be stored in a pipeline register 1006 as the saturation control signal (e.g., "SAT_CONT" in FIG. 8) and further transmitted to the circuit block 1008. The circuit block 1008 first selects between the saturation vector and the input data (e.g., the 80- or 64-bit input data) by using the saturation control signal from the pipeline register 1006 as the selection signal. If the leading zero detection result is equal to the shift control 1004, the saturation control has the value of "1", and the first multiplexer in the circuit block 1008 selects the saturation vector as the output. Otherwise, the first multiplexer in the circuit block 1008 selects the input data as the output and transmit the output to the second multiplexer. The second multiplexer selects the output from the expected branch by using the selection signal (e.g., PART[2:0] in FIG. 8) to generate the output (e.g., "Wt_out" in FIG. 8).

For example, when PART[2:0]=[1,0,0], the second multiplexer selects the output from the 80-bit shifter module branch; when PART[2:0]=[0,1,0], the second multiplexer selects the output from the branch of the two 40-bit shifter modules; when PART[2:0]=[0,0,1], the second multiplexer selects the output from the branch of the four 20-bit shifter module branch for the 80-bit input data. The second stage may further include the circuit block 1010 (e.g., a variable packing and rounding block) that receives the output data from the first stage (e.g., "Wt" in 918 of FIG. 7) and the saturation vector (e.g., "Wt_out" in FIG. 8) and performs variable packing operations and/or rounding operations on the input data before transmitting the output to the 2×1 multiplexer 1016 that selects the final output from the expected branch.

The second stage illustrated in FIG. 8 also includes the saturation block 1012 that selects between the saturation vector from the first stage (e.g., "SAT_SHF_VEC" in 918 of FIG. 7) and the output of the first stage (e.g., "Vt" in 918 of FIG. 7) by using the saturation control signal (e.g., "SAT_CONT" in 1012) to generate a first output. The first output is then passed to a 3×1 multiplexer that selects the saturation output (e.g., "SAT_OUT_80") from the expected branch by using the selection signal (e.g., "PART[2:0]" in 1012 of FIG. 8). For example, when PART[2:0]=[1,0,0], the 3×1 multiplexer selects the output from the 80-bit shifter module; when PART[2:0]=[0,1,0], the 3×1 multiplexer selects the output from those two 40-bit shifter modules as the saturation output; and when PART[2:0]=[0,0,1], the 3×1 multiplexer selects the output from the four 20-bit shifter modules as the saturation output. The 2×1 multiplexer 1016 then selects the final output from the saturation output of 1012 and the output of the variable packing and routing module 1010 by using the packing signal (e.g., "PACK" in FIG. 8) to complete the desired or required operations for second cycle of the shifter illustrated in FIGS. 9-10.

Figure 9:
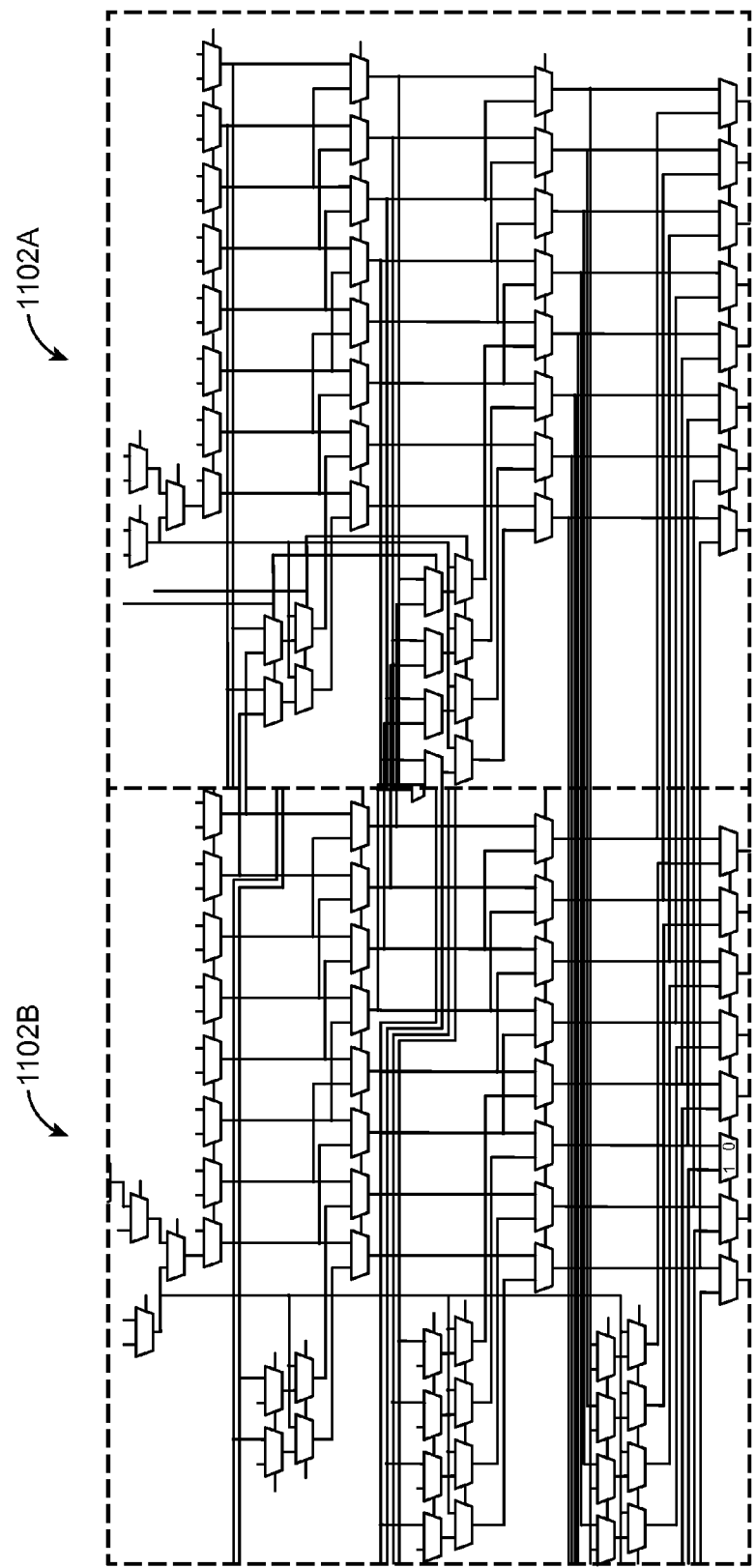
FIG. 9 illustrates a more detailed schematic design of a shifter in some embodiments.

FIG. 9 illustrates a more detailed schematic design of a shifter in some embodiments. More specifically, FIG. 9 illustrates a schematic design of a shifter that performs 16-bit shift (2×8-bit shift) and rotate operations. FIG. 9 includes two portions —1102A and 1102B. The first portion 1102A is illustrated in greater details in FIG. 9A, and the second portion 1102B is illustrated in greater details in FIG. 9B.

Figure 9A:
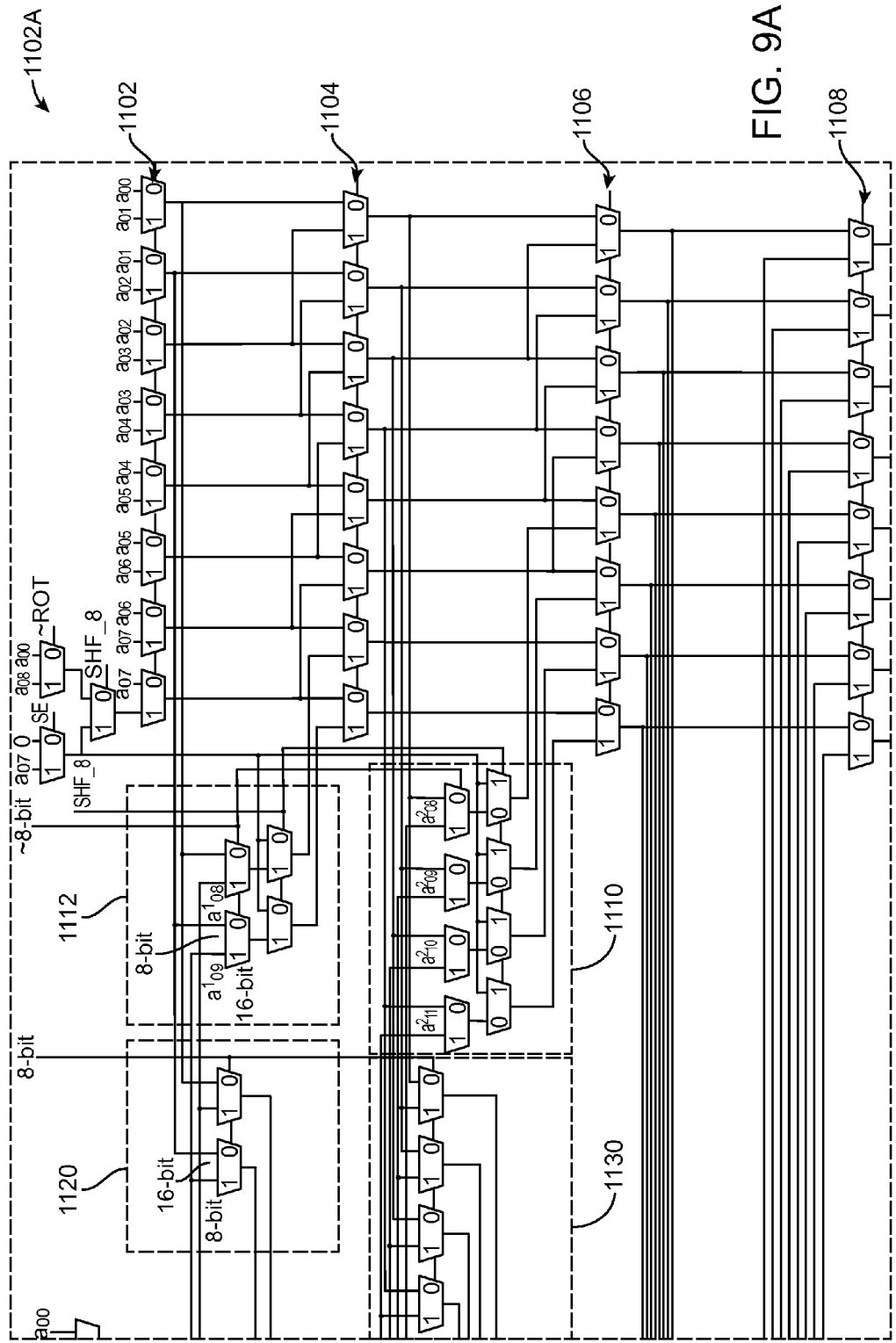
FIGS. 9A-B illustrate more detailed views of the shifter schematic design illustrated in FIG. 9 in some embodiments.
Figure 9B:
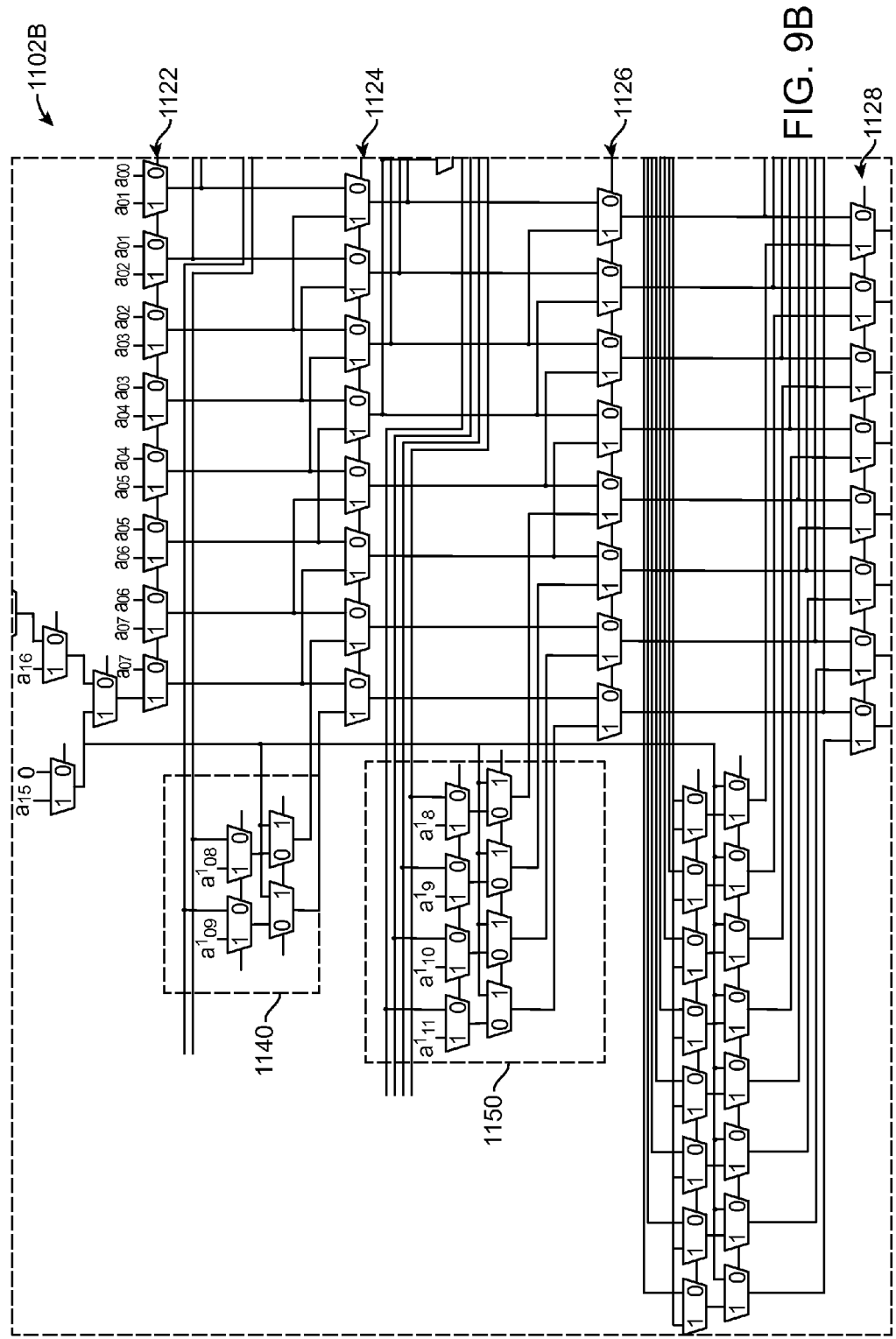

FIGS. 9A-B illustrate more detailed views of the shifter schematic design illustrated in FIG. 9 in some embodiments. More specifically, FIG. 9A illustrates a shifter module 1102A for the shifter illustrated in FIG. 9. The shifter module includes four levels, each performing shifting operations of a respective shift amount. For example, the first sequence of multiplexers 1102 perform 1-bit shifting operations; the second sequence of multiplexers 1104 perform 2-bit shifting operations; the third sequence of multiplexers 1106 perform 4-bit shifting operations; and the fourth sequence of multiplexers 1108 perform 8-bit shifting operations.

The shifter module illustrated in FIG. 9A further includes the logic that controls the partitions of rotating operations. For example, the circuit block 1120 includes the logic components controlling the partitions for 1-bit rotating operations; the circuit block 1112 includes the logic components controlling the partitions for 2-bit rotating operations; the circuit block 1130 includes the logic components controlling the partitions for 4-bit rotating operations; and the circuit block 1110 includes the logic components controlling the partitions for 8-bit rotating operations.

FIG. 9B illustrates another shifter module 1102B for the shifter illustrated in FIG. 9. The shifter module 1102B also includes four levels, each performing shifting operations of a respective shift amount. For example, the first sequence of multiplexers 1122 perform 1-bit shifting operations; the second sequence of multiplexers 1124 perform 2-bit shifting operations; the third sequence of multiplexers 1126 perform 4-bit shifting operations; and the fourth sequence of multiplexers 1128 perform 8-bit shifting operations. The shifter module 1102B together with the shifter module 1102A performs two 8-bit shifting operations and thus perform 16-bit shift. When receiving 8-bit input operands, the shifter module 1102A may receive an 8-bit input operand perform the shifting and/or rotating operations on an 8-bit input operand, and the shifter module 1102B may receive the next input operand to perform the shifting and/or rotating operations.

When receiving a 16-bit input operand, the shifter module 1102A may receive, for example, the most significant 8 bits of the 16-bit input operand and perform the desired or required shifting and/or rotating operations. In the meantime, the shifter module 1102B may receive the least significant 8 bits of the 16-bit input operand and perform the desired or required shifting and/or rotating operations. The shifter module illustrated in FIG. 9B also includes the logic that controls the partitions of rotating operations. For example, the circuit block 1140 includes the logic components controlling the partitions for 2-bit rotating operations; and the circuit block 1150 includes the logic components controlling the partitions for 8-bit rotating operations. The circuit blocks for controlling the partitions for 1-bit and 4-bit rotating operations are not shown in the shifter module 1102B for ease of illustration.

FIG. 4 illustrates a 64-bit shifter by combining two 32-bit shifters (602 and 604) in some embodiments. Assuming the shifter design illustrated in FIG. 4 includes 32-bit shifter module, the shifter design illustrated in FIG. 4 may process 64-bit input data by receiving the most significant 32-bit of the 64-bit input data (e.g., "v[63:32]") at the first shifter 602 and the least significant 32-bit of the 64-bit input data (e.g., "w[31:0]") at the second shifter 604. The same shifter having the 32-bit shifter module may thus process 32-bit input data by receiving 32-bit input data as a whole at, for example, the second shifter module 604 and receiving the next 32-bit input data as a whole at, for example, the first shifter module 602. The 2×1 multiplexer selects the 64-bit output from the first shifter module 602 and the second shifter module 604 according to the selection signal "PART [3:0]".

Figure 1:
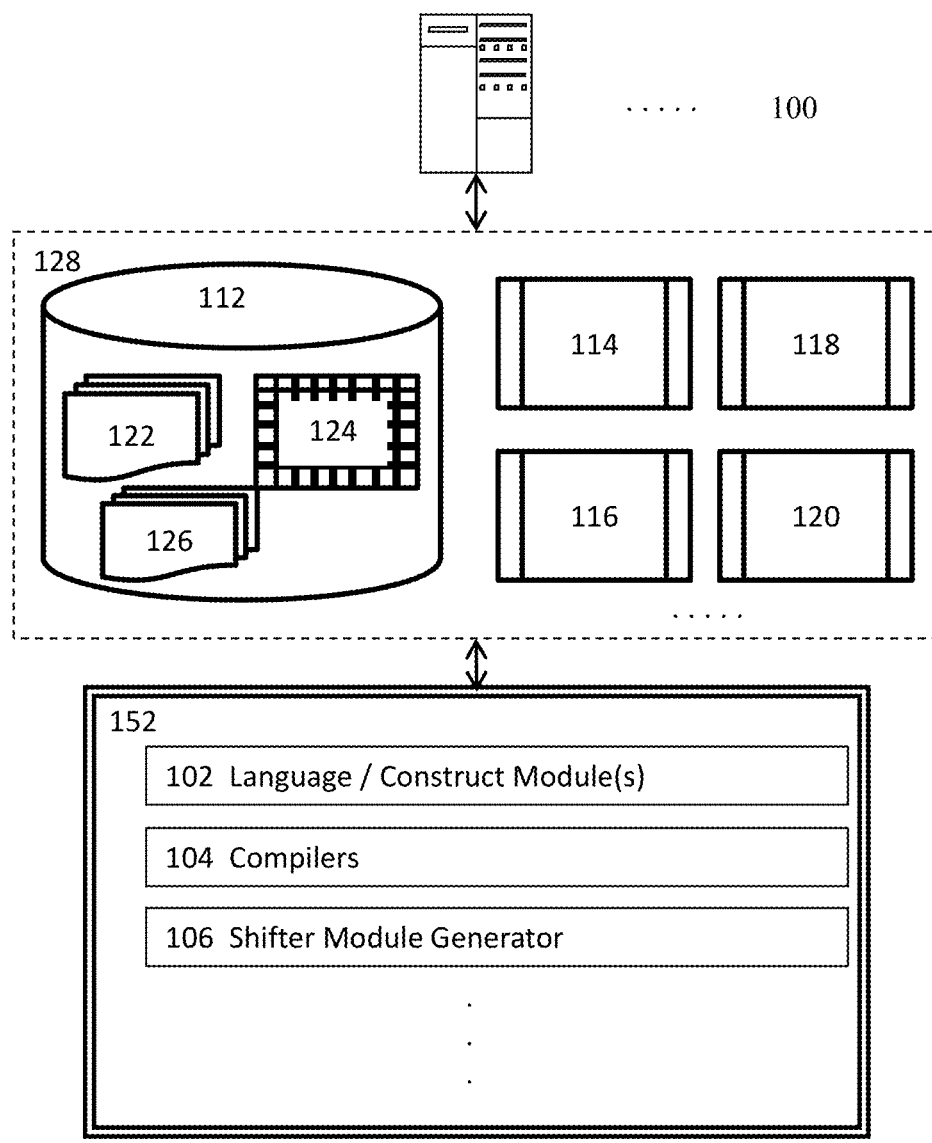
FIG. 1 illustrates a high level block diagram of a system for implementing a shifter design with an electronic design automation tool in some embodiments.
Figure 2:
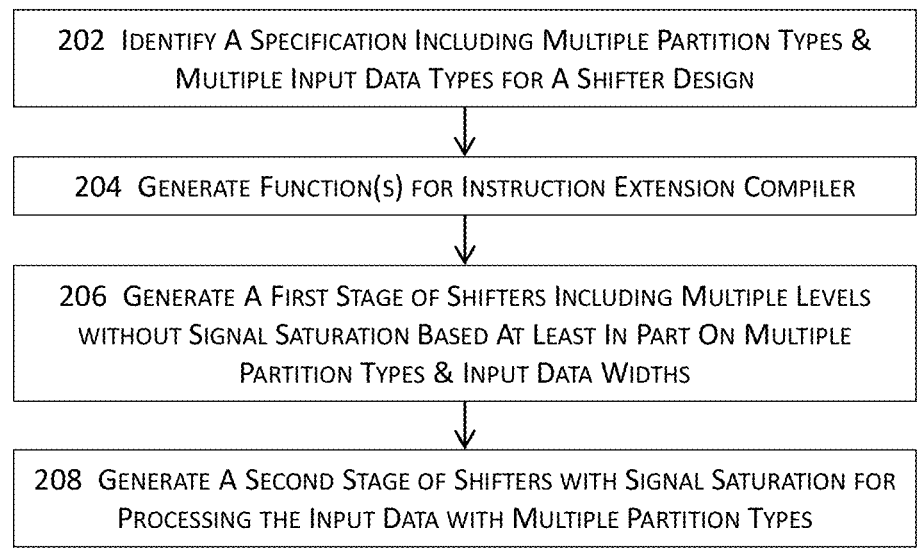
FIG. 2 illustrates a high level block diagram of a method or system for implementing a shifter design with an electronic design automation tool in some embodiments.

FIG. 2 illustrates a high level block diagram for a method or system for implementing a shifter design with an electronic design automation tool in some embodiments. In these embodiments, the method or system may identify a specification that includes multiple partition types and multiple input data widths for a shifter design at 202. The specification for a shifter design may include, for example, text-based expressions of the behavioral, structural, and/or register-transfer-level ("RTL") architecture of the shifter in some embodiments. In some of these embodiments, the specification may further include the behavior of the shifter with respect to time. In the embodiments where the specification includes the behavioral or RTL architecture, the method may invoke the compiler (e.g., the one or more compiler modules 104 of FIG. 1) either alone or in conjunction with one or more other EDA tools (e.g., a synthesizer for synthesis) to determine the structural architectural and/or logic gate layout.

In some embodiments, the multiple widths or data types for input data or input operands may include two or more of the natural partitions of 64-bit wide input data such as 2-bits, 4-bits, 8-bits, 16-bits, 32-bits, and 64-bits. In some other embodiments, the multiple widths may include two or more of the natural partitions of 80-bit wide input data such as 20-bits, 40-bits, and 80-bits. Yet in some other embodiments, the multiple widths may include any one of the natural partitions of 64-bit wide input data such as 2-bits, 4-bits, 8-bits, 16-bits, 32-bits, and 64-bits and any one of the natural partitions of 80-bit wide input data such as 20-bits, 40-bits, and 80-bits. Processors often provide 4, 8, or 16 guard bits in the accumulators to prevent overflow during accumulation operation. In these latter embodiments, the shifter whose design is generated by these methods may perform various shift and/or rotate operations on input data having, for example, 8-16-32-64-bit widths as well as input data with guard bits having widths of, for example, 20-40-80-bit widths.

The multiple partition types include some or all of the natural partitions of 64-bit (e.g., 1-bit, 2-bits, 4-bits, 8-bits, 16-bits, 32-bits, and 64-bits) and/or some or all of the natural partitions of 80-bit (e.g., 20-bits, 40-bits, and 80-bits). At 204, the method may identify or generate functions that may be used by one or more compilers (e.g., one or more compiler modules 104) to generate the shifter design. In some embodiments where these functions already exist, the method may simply identify these existing functions at 104; otherwise, the method may generate these functions that are required by the compiler to create the shifter design at 204. These functions may include, for example, functions to interconnect various circuit components in the shifter design, functions to generate multiplex selection signals, etc.

At 206, the method may generate a first stage of circuit components for the shifter design to perform shift and/or rotate operations on input data without signal saturation. In some of these embodiments illustrated in FIG. 2, the method may generate the first stage of circuit components for the shifter design to perform shift and/or rotate operations on input data having multiple data types with multiple partition types but without signal saturation. In some of these embodiments, the method may generate the first stage non-signal saturation circuit block based at least in part upon multiple partition types and input data widths. In these embodiments, the first stage of circuit components includes multiple levels of multiplexers (e.g., 2×1 multiplexers), where each level includes a sequence of multiplexers to shift input data (e.g., a data word) of a certain width by specific shift amounts.

For example, the intermediate levels for a 64-bit shifter may include a first level that shifts by 1 bit, a second level that shifts by 2 bits, a third level that shifts by 4 bits, a fourth level that shifts by 8 bits, a fifth level that shifts by 16 bits, and a sixth level that shifts by 32 bits. The number of intermediate levels may be determined by the width of the input data. For example, if the input data includes an N-bit value the number of intermediate levels may be $\log_2(N)-1$, where N is an integer. In some embodiments, the total number of multiplexers may also be determined by $N \times \log_2(N)$ for N-bit input data. At 208, the method may generate a second stage of circuit components for the shifter design to perform operations including leading zero detection, signal saturation, etc. In some of these embodiments illustrated in FIG. 2, the method may generate the second stage of circuit components for the shifter design to perform shift and/or rotate operations on input data having multiple data types with multiple partition types as well as signal saturation. More details about the sub-processes 206 and 208 are described below with reference to FIGS. 3 and 3A-C.

One of the advantages of these embodiments described with reference to at least FIG. 2 is that these embodiments may properly synthesize a shifter design having multiple data types (e.g., input operands having 80-, 40-, and/or 20-bit widths or input operands having one or more 64-, 32-, 16-, 8-bit widths as well as one or more 80-, 40-, and/or 20-bit widths) from its specification (e.g., an HDL specification for the shifter) even though conventional synthesizers are unable to properly perform synthesis on such a shifter design. Another advantage of these embodiments described herein is a shifter in a single hardware block that not only includes the logic to handle multiple data types but is also optimized for the die area, performance, and/or power consumption of the single hardware block shifter. Such single-block shifter designs present substantial improvement over conventional shifter designs that are unable to handle multiple data types or any other shifter designs that simply attempt to combine multiple pre-existing single-data type shifters into one microprocessor without the proper logic to handle multiple data types and without any optimization at all in the die area, performance, or power consumption.

Another advantage is that these techniques described herein may be integrated into the design process of a custom processor including a shifter from the early stage (e.g., from the specification of the processor) while optimizing the die area, power consumption, and/or performance of at least the shifter design in view of the other specifications or requirements of the custom processor. Another advantage of these embodiments described with reference to at least FIG. 2 is that these embodiments may generate the design in a single hardware block for the shifter while accommodating multiple partition types (e.g., 8-16-20-32-40-64-80-bit, etc. partitions) for input data having multiple data types (e.g., 160-bit, 80-bit, 64-bit, 32-bit, etc.) with various shift amounts (e.g., 1-bit shift, 2-bit shift, 4-bit shift, 8-bit shift, 16-bit shift, 20-bit shift, 32-bit shift, 40-bit shift, 64-bit shift, etc.)

Figure 2A:
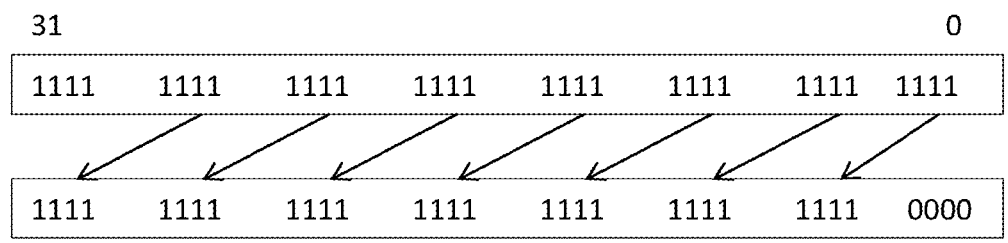
FIGS. 2A-F illustrate the performance of shift and rotate operations on input data and the outcome of these shift and rotate operations in some embodiments.
Figure 2B:
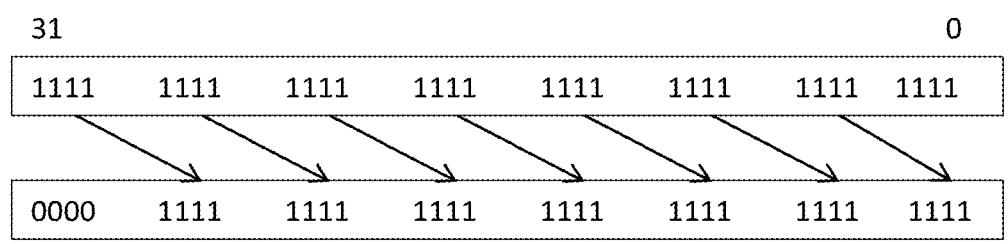
Figure 2C:
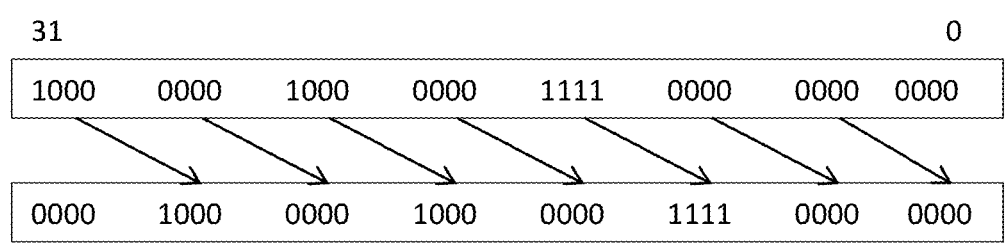

FIGS. 2A-F illustrate the performance of shift and rotate operations on input data and the outcome of these shift and rotate operations in some embodiments. FIG. 2A illustrates a logical shift left operation with a shift amount of 4 bits on 32-bit input data. The logical shift left operation performs a 4-bit left shift and sets the lower 4 bits of the result to zeros. FIG. 2B illustrates a logical shift right operation with a shift amount of 4 bits on 32-bit input data. The logical shift right operation performs a 4-bit right shift and sets the upper 4 bits of the result to zeros. FIG. 2C illustrates an arithmetic shift right operation with a shift amount of 4 bits on positive 32-bit input data. The arithmetic shift right operation performs a 4-bit right shift and sets the upper 4-bits of the result to the bit values corresponding to the sign bit of the input data.

Figure 2D:
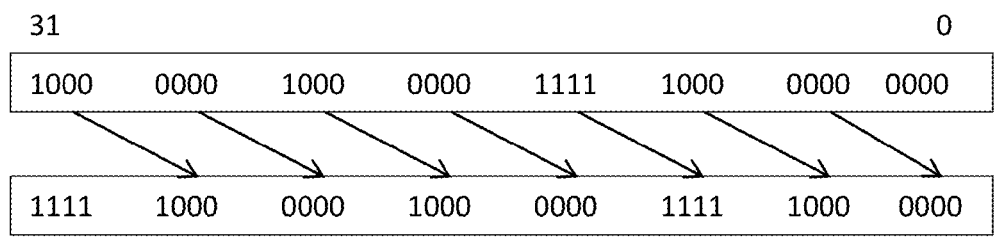
Figure 2E:
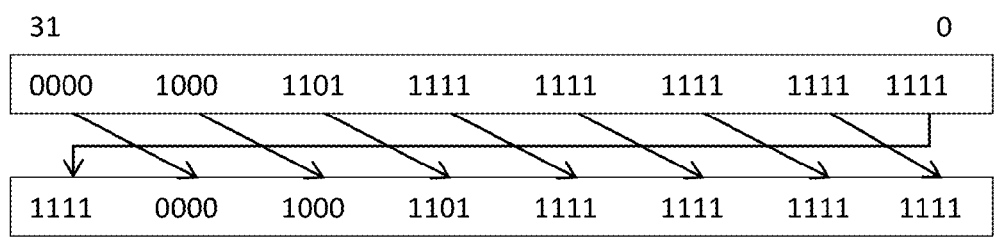
Figure 2F:
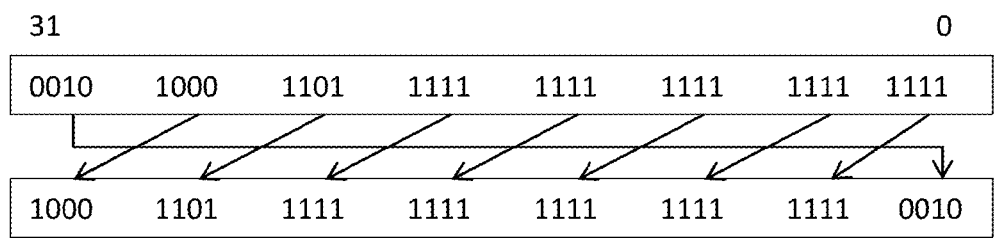

FIG. 2D illustrates an arithmetic shift right operation with a shift amount of 4 bits on negative 32-bit input data. The arithmetic shift right operation performs a 4-bit right shift and sets the upper 4-bits of the result to the bit values corresponding to the sign bit of the input data. FIG. 2E illustrates the rotate right operation with a shift amount of 4 bits on 32-bit input data. The rotate right operation performs a 4-bit right shift on the 32-bit input data and sets the lower 4 bits of the result to the upper 4 bits of the 32-bit input data. FIG. 2F illustrates the rotate left operation with a shift amount of 4 bits on 32-bit input data. The rotate left operation performs a 4-bit left shift on the 32-bit input data and sets the upper 4 bits of the result to the lower 4 bits of the 32-bit input data.

Figure 3:
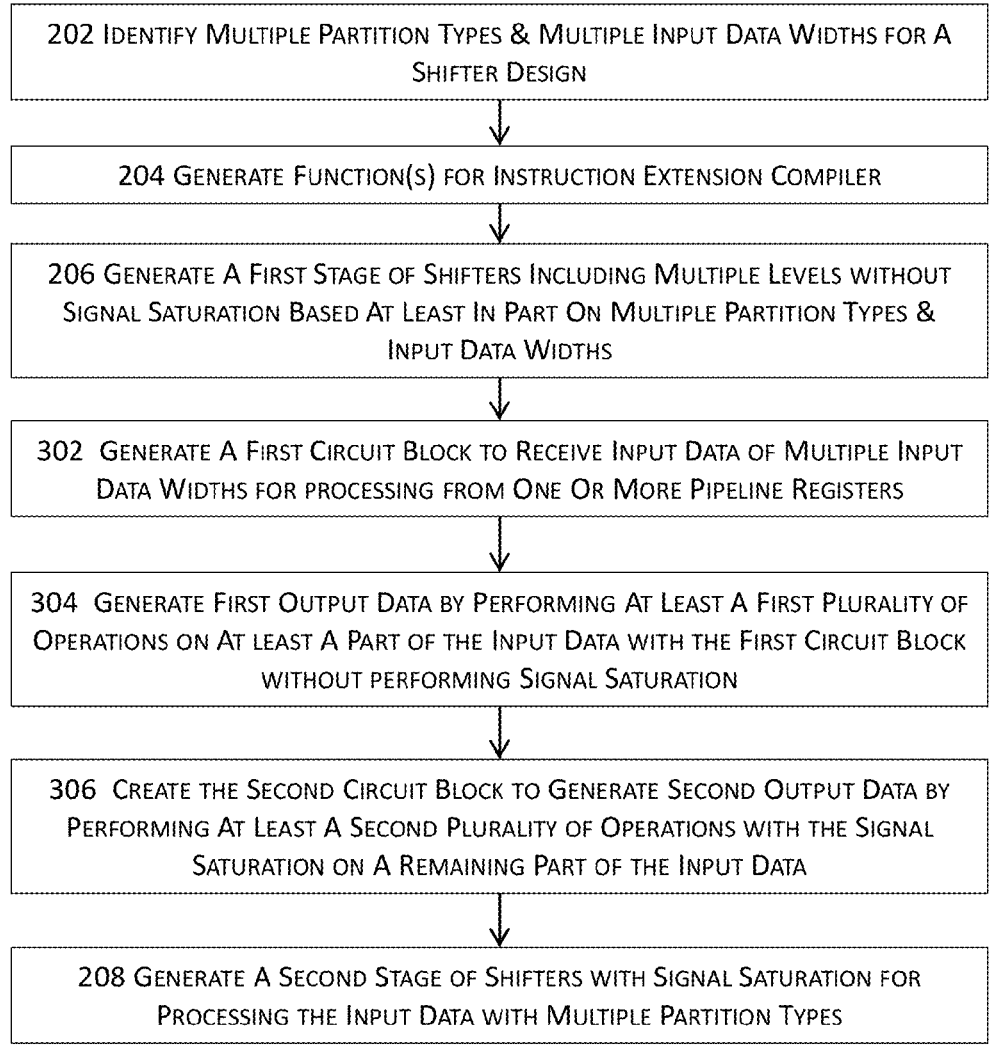
FIG. 3 illustrates a more detailed block diagram of a method or system for implementing a shifter design with an electronic design automation tool in some embodiments.

FIG. 3 illustrates a more detailed block diagram for a method or system for implementing a shifter design with an electronic design automation tool in some embodiments. In these embodiments, the method or system may identify multiple partition types and multiple input data widths for a shifter design at 202 in identical or substantially similar manners as those described above with reference to FIG. 2 above. At 204, the method may identify or generate functions that may be used by one or more compilers (e.g., one or more compiler modules 104) to generate the shifter design in identical or substantially similar manners as those described above with reference to FIG. 2 above.

At 206, the method may generate a first stage of circuit components for the shifter design to perform shift and/or rotate operations on input data without signal saturation. In some embodiments, the method may generate a first circuit block to receive input data of multiple input data widths for processing at 302. In some of these embodiments, the method may generate the first circuit block and interconnect the inputs of the first circuit block to, for example, one or more pipeline registers or a register file of a processor. The input data may include data words of multiple widths. For example, the method may generate the first circuit block in such a way to receive both 64-bit and 80-bit data words for processing. The processing may include a plurality of shift operations, a plurality of rotate operations, packing operations, unpacking operations, any other requisite operations for the aforementioned shift and rotate operations, inversion of signed input data to unsigned input data, or any combinations thereof.

The design of the first circuit block may include the design of multiple levels of multiplexers, an unpacking operation module, left shift/rotate operation module, right shift/rotate operation module, an inversion operation module, an interconnects therebetween. Each level of the multiple levels of multiplexers may include a sequence of multiplexers to perform shift or rotate operations with a respective shift amount. In some embodiments, these multiple levels of multiplexers include a plurality of 2×1 multiplexers controlled by partition type signals that correspond to multiple partition types. At 304, the method may generate first output data by performing at least a first plurality of operations on at least a part of the input data with the first circuit block without performing signal saturation on the at least a part of the input data. The first plurality of operations may include, for example, unpacking operations, a plurality of shift operations, a plurality of rotate operations, packing operations, any other requisite operations for the aforementioned shift and rotate operations, inversion of signed input data to unsigned input data, or any combinations thereof. More details about the first plurality of operations will be described below with reference to FIGS. 9-10.

At 306, the method may create the second circuit block to generate second output data by performing at least a second plurality of operations with signal saturation on a remaining part of the input data. In some embodiments, the at least a part of the input data may include the input data having the most significant bit less than the upper bit of the corresponding partition type, and the remaining part of the input data may include the input data having the least significant bit equal to or greater than the upper bit of the corresponding partition type. For example, for input data w, the at least a part of the input data for the first circuit block to process may include the part w[79:0], and the remaining part of the input data may include the part w[159:80] with the 80-bit partition type for the second circuit block to process. The method may proceed to 208 to generate a second stage of circuit components including the second circuit block and interconnections for the shifter design to perform operations including leading zero detection, signal saturation, etc.

Figure 3A:
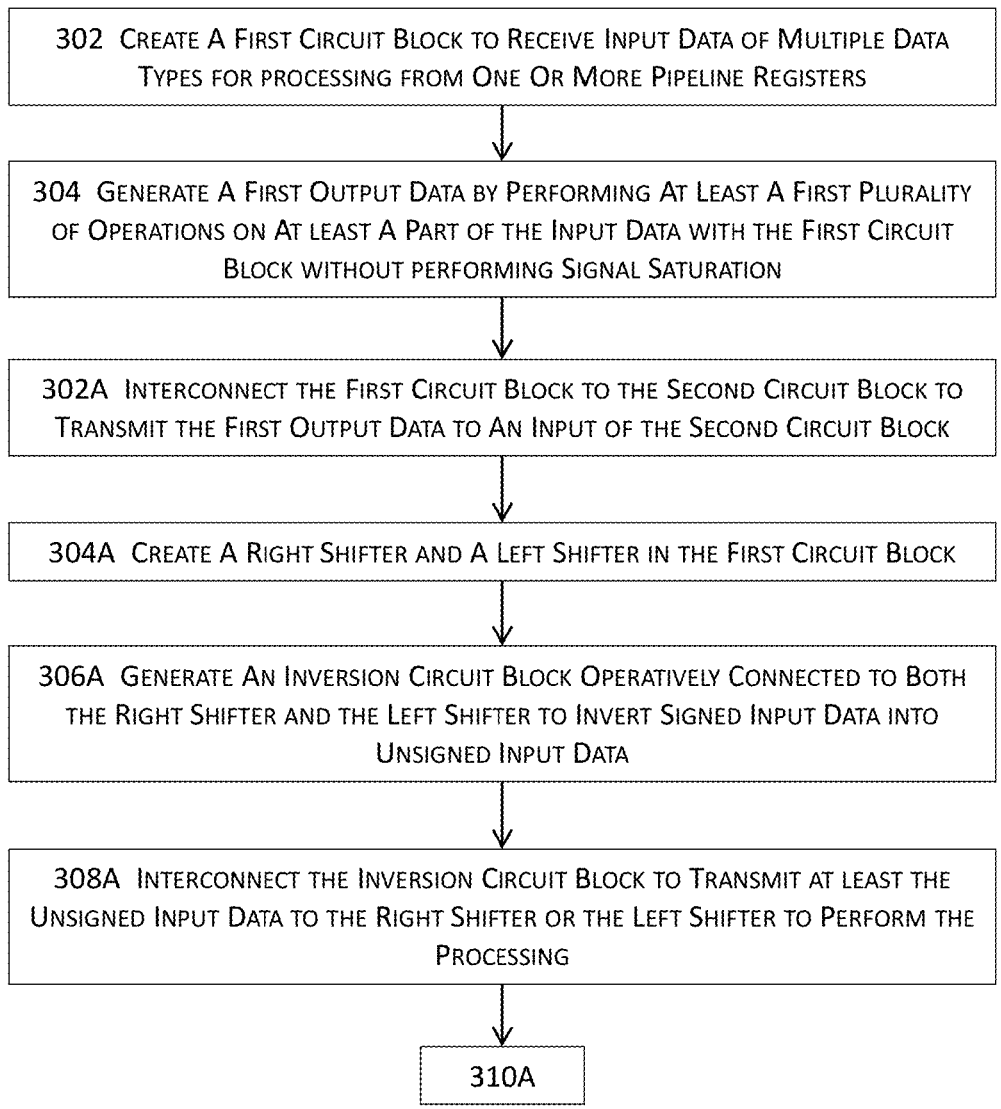
FIGS. 3A-C jointly illustrate a more detailed block diagram of a method or system for implementing a shifter design with an electronic design automation tool in some embodiments.
Figure 3B:
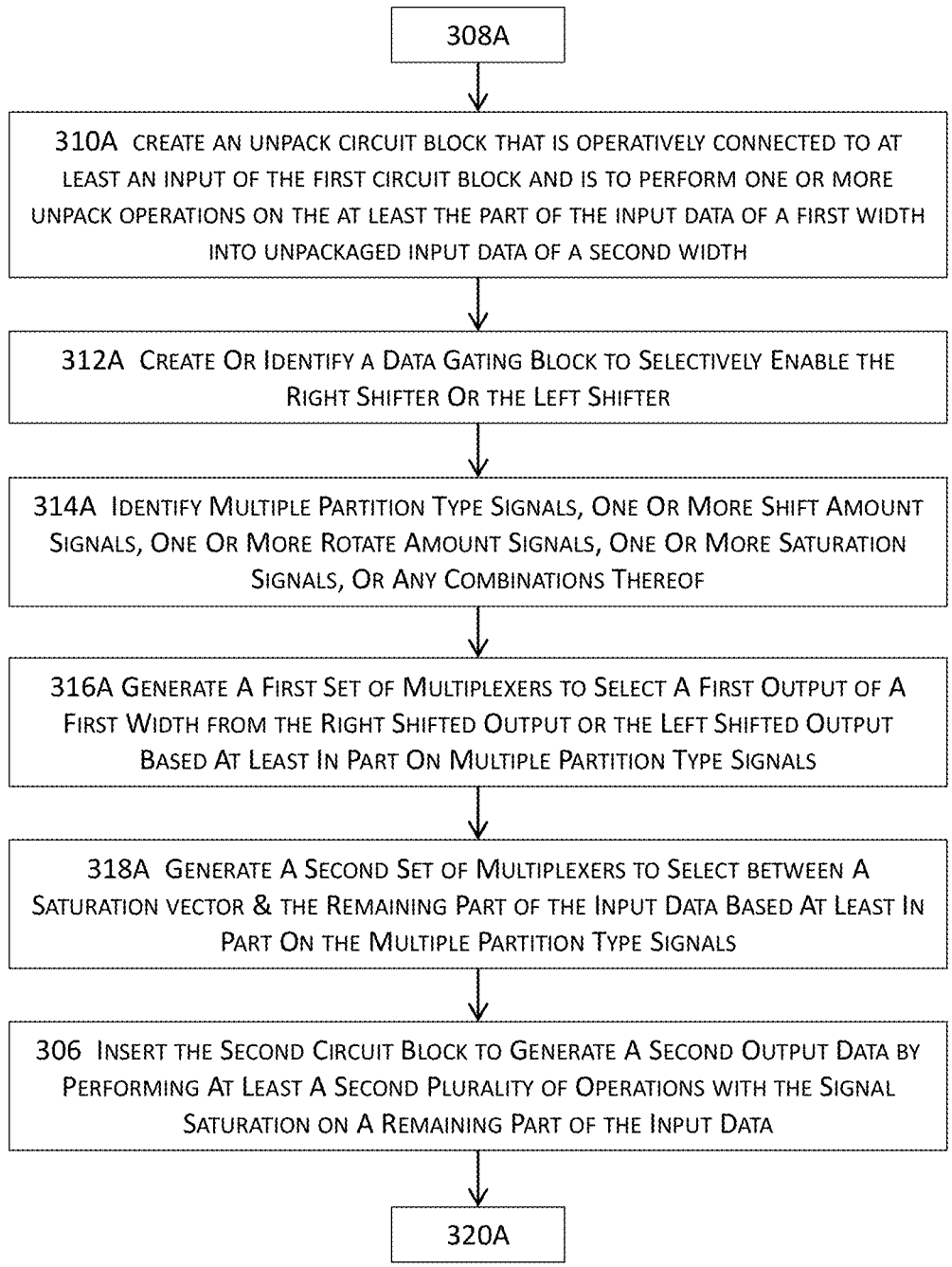
Figure 3C:
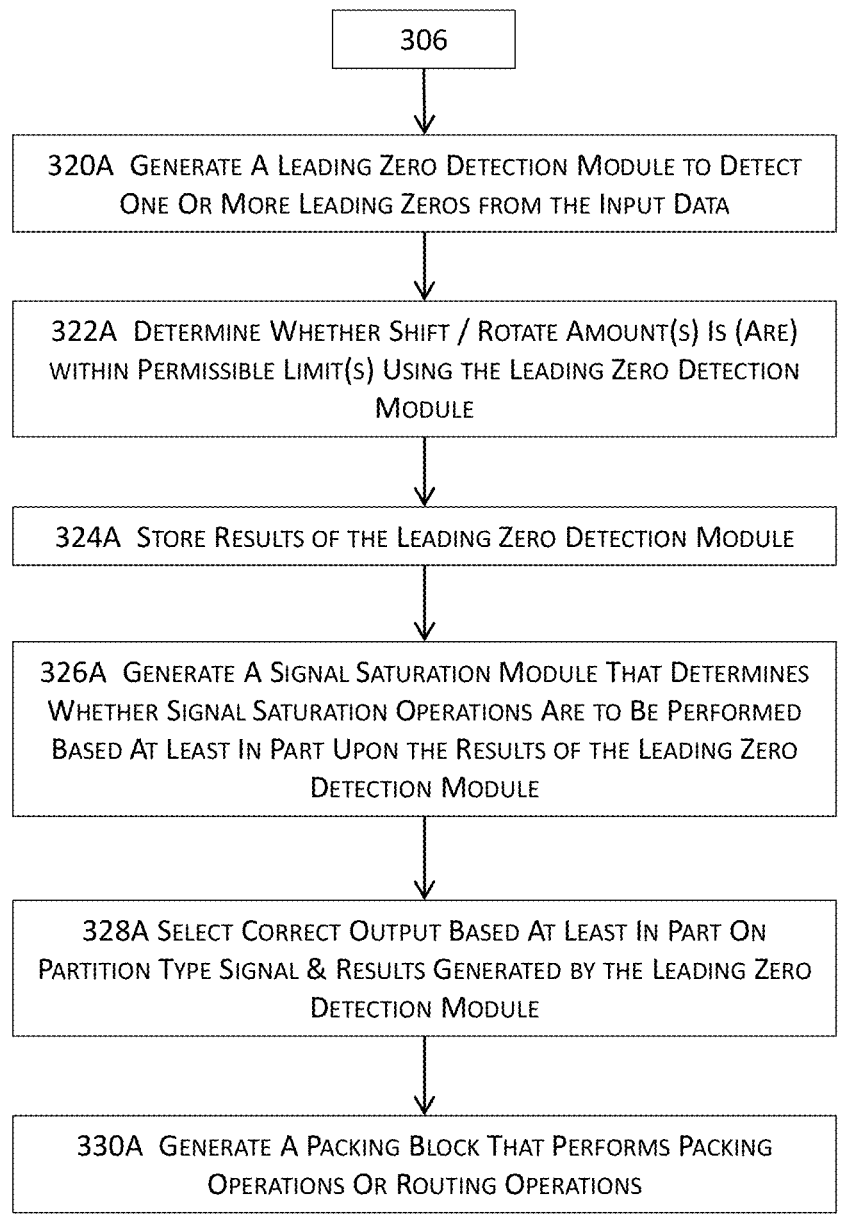

FIGS. 3A-C jointly illustrate a more detailed block diagram for a method or system for implementing a shifter design with an electronic design automation tool in some embodiments. It shall be noted that some or all of these acts illustrated in FIGS. 3A-C and described herein may not necessarily be performed in a certain order unless otherwise stated herein. For example, the method illustrated in these figures may create various circuit block designs in any order although it may be customary to generate the shifter design from the inputs. In these embodiments, the method may perform the acts 302 and 304 in identical or substantially similar manners as those described for FIG. 3 above.

At 302A, the method may interconnect the first circuit block to the second circuit block to transmit the first output data to an input of the second circuit block. At 304A, the method may create a right shifter and a left shifter in the first circuit block to respectively perform right shift operations and left shift operations. At 306A, the method may generate an inversion circuit block. The inversion circuit block is to invert signed input data into unsigned input data and thus enables the shifter to support both signed and unsigned input data. The method may generate the inversion circuit block by using any inversion techniques including, for example, the two's complement system. At 308A, the method may operatively interconnect the inversion circuit block to the input of both the right shifter and the left shifter to perform the desired shift operations on the unsigned input data.

Referring to FIG. 3B, the method may create an unpack circuit block that performs a plurality of unpacking operations on the input data at 310A. A packing operation receives, for example, multiple input data words of the same width or different widths and creates a single data word of a specific width by using a format control. An unpacking operation is theoretically the inverse of the corresponding packing operation and uses the same format control for the packing operation to process, for example, a data string, to generate a plurality of data words of the same or different widths. At 312A, the method may create or identify a data gating block to selectively enable the right shifter or the left shifter on demand. In some embodiments where the data gating block already exists, the method may identify the data gating block. Otherwise, the method may create the data gating block in the first circuit block of the shifter design.

The data gating block enables a shifter (e.g., the left shifter) to perform the desired or required shift operation while disabling or shutting off the other shifter (e.g., the right shifter) that is not used to perform the required or desired shifter operation to reduce power consumption of the first circuit block and thus shifter. At 314A, the method may identify multiple partition type signals, one or more shift amount signals, one or more rotate amount signals, one or more saturation signals, or any combinations thereof. A partition type signal includes the information to indicate which partition type (e.g., 4-bit, 8-bit, etc.) is to be used to shift, for example, an input data word by a shift amount or a rotate amount respectively indicated by a shift amount signal or a rotate amount signal.

A signal saturation signal indicates whether or not an input data word is to be saturated. At 316A, the method may generate a first set of multiplexers to select a first output of a first width from the right shifted output or the left shifted output based at least in part upon the some or all of the signals identified at 314A. For example, the method may use a partition type signal (e.g., "PART[2:0]" in FIG. 7), a first saturation signal (e.g., "SHF_SAT" in FIG. 7), a second saturation signal (e.g., "SAT_SHF_VEC" in FIG. 7) to correctly select the first 32-bit output from the right shifted output or the left shifted output. The method may further generate a second set of multiplexers to select a second output of a second width from the right shifted output or the left shifted output based at least in part upon the some or all of the signals identified at 314A.

For example, the method may use a partition type signal (e.g., "PART[2:0]" in FIG. 7), a first saturation signal (e.g., "SHF_SAT" in FIG. 7), a second saturation signal (e.g., "SAT_SHF_VEC" in FIG. 7) to correctly select the first 32-bit output from the right shifted output or the left shifted output. The method may proceed to 306 to generate the second circuit block in identical or substantially similar manners as those described above with reference to FIG. 3.

Referring to FIG. 3C, the method may generate a leading zero detection module that detects the leading zeros of the input data into the second circuit block at 320A. The method may generate a circuit block that is connected to the output of the leading zero detection module and selects the correct input based at least in part upon the whether or not the results from the leading zero detection module are to be saturated by using a saturation vector, a partition type signal, and the results generated by the leading zero detection module at 322A.

At 324A, the method may store results generated by the leading zero detection module. For example, the method may store the leading zero detection or the determination results in a pipeline register that is operatively connected to an output of the leading zero detection module. At 326A, the method may generate a signal saturation module to determine whether signal saturation is to be performed based at least in part upon the results generated by the leading zero detection module. At 328A, the method may further use the results generated by the leading zero detection module (e.g., "SAT_CONT" in FIG. 8) and a partition type signal (e.g., "PART[2:0]" in FIG. 8) to select between the saturation vector (e.g., "SAT_VEC" in FIG. 8) and an input data signal as the output (e.g., "Wt_out" in FIG. 8). At 330A, the method may further generate a packing circuit block to perform packing operations. In some embodiments, the method may also generate the packing circuit block to include routing operations as part of the functionality of the packing circuit block.

In one or more embodiments, FIG. 1 shows an illustrative high level schematic block diagrams for a system for implementing a shifter design with an electronic design automation tool and may comprise one or more computing systems 100, such as a general purpose computer described in the System Architecture Overview section to implement one or more special proposes. The one or more computing systems 100 may also initiate or interact with other computing systems to access various resources 128 that may comprise a floorplanner, a global routing engine, and/or a detail routing engine 114, a layout editor 116, a design rule checker 118, a verification engine 120, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), electronic circuit design specification database(s), various statistics, various data, rule decks, various design rules, constraints, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof 152 that may comprises one or more programming language and/or construct modules 102 including, for example, various constructs for generating shifter designs, the register file construct, the instruction extension language construct, etc. to declare new register file, implement the microprocessor design or a portion thereof, to analyze sharing and/or dependency among instructions, to generate, save, and restore sequences of a co-processor, to declare instructions as intrinsic functions, to generate the instruction set architecture (ISA) description, etc., one or more compiler modules 104 including, for example, an instruction extension compiler and a C/C++ compiler, etc. to declare some or all instructions as intrinsic functions, to declare the number of read and/or write ports, to create conventional programming language definitions (e.g., definitions in C, 0++, etc. conventional programming languages) of intrinsics for new instructions (e.g., user-specified instructions) as functions, to generate and/or analyze dependency among some instructions, to generate the save and restore sequences for a co-processor, to derive or generate physical and/or schematic implementation of microprocessor designs either alone or in conjunction with one or more other modules, to generate the instruction set architecture (ISA) description and the objects (e.g., PERL objects for obtaining the ISA and pipeline information) for user-specified instructions, to translate implementation semantics into HDL (hardware description language) of the register file, the interlock, bypass routes, core interfaces, exceptions, etc. for subsequent verification of the implementation semantics, etc.

A compiler (e.g., an instruction extension compiler) may be used to generate the dynamic linking libraries (or dynamic-link libraries or DLL) and process a source description file for the shifter design with before the source description file is further processed to generate the shifter design with the new, custom, or designer-specified shifter design parameters (e.g., multiple partition types, multiple shift amounts, etc.), without requiring the shifter design generation output to be re-linked or re-compiled. The compiler may support both a hardware description language (HDL) and a general high-level programming language (e.g., C or C++ programming language).

For example, the compiler may explore and verity the implementations of the microprocessor architecture or a part thereof before the source description file is further processed to generate the shifter design which comprises one or more of the software tools 208, the hardware RTL (register transfer level) designs, and/or various circuit blocks. The various software, hardware modules or combinations thereof 152 may further includes one or more shifter module generator modules 106 to generate shifter designs with the corresponding hardware designs in various design domains (e.g., the register transfer level or RTL, the schematic domain, the gate level, etc.), software designs, or even test bench designs and electronic design automation tool scripts or code, etc. for the shifter designs with the desired or required multiple shift amounts, multiple partition types, etc. for input data of multiple data types (e.g., input operands having 64-bit or 80-bit widths).

System Architecture Overview

Figure 10:
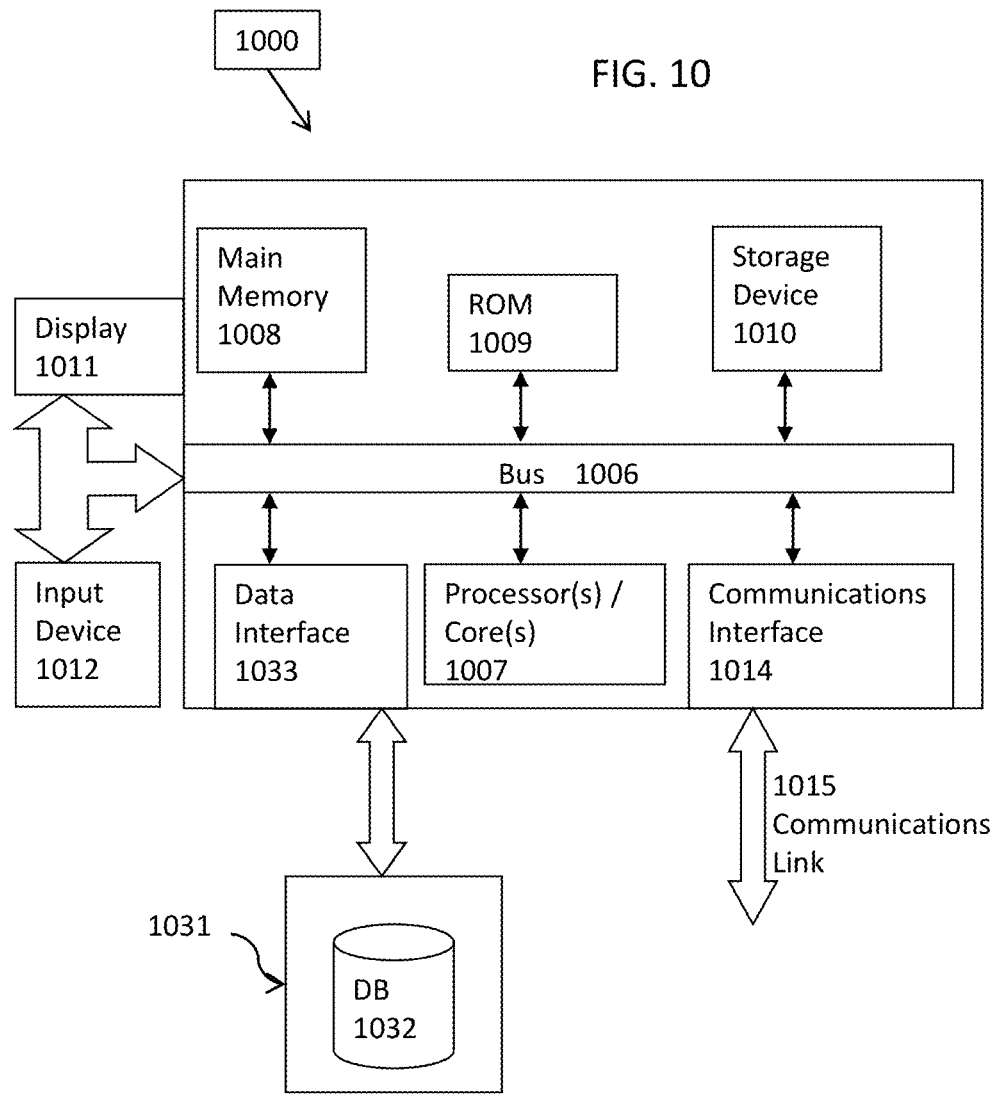
FIG. 10 illustrates a computerized system on which a method for implementing a shifter design with an electronic design automation tool may be implemented in some embodiments.

FIG. 10 illustrates a block diagram of an illustrative computing system 1000 suitable for back annotating and visualizing parasitic models of electronic designs as described in the preceding paragraphs with reference to various figures. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control (not shown).

According to one embodiment, computer system 1000 performs specific operations by one or more processor or processor cores 1007 executing one or more sequences of one or more instructions contained in system memory 1008. Such instructions may be read into system memory 1008 from another computer readable/usable storage medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1007, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1000. According to other embodiments of the invention, two or more computer systems 1000 coupled by communication link 1015 (e.g., LAN, PTSN, or wireless network) may perform the sequence of instructions required to practice the invention in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010, or other non-volatile storage for later execution. In an embodiment, the computer system 1000 operates in conjunction with a data storage system 1031, e.g., a data storage system 1031 that contains a database 1032 that is readily accessible by the computer system 1000. The computer system 1000 communicates with the data storage system 1031 through a data interface 1033. A data interface 1033, which is coupled to the bus 1006, transmits and receives electrical, electromagnetic or optical signals that include data streams representing various types of signal information, e.g., instructions, messages and data. In embodiments of the invention, the functions of the data interface 1033 may be performed by the communication interface 1014.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. An apparatus for performing shifting and rotating operations on input data, comprising:
    one or more pipeline registers storing the input data that have multiple data types;
    a shifter comprising a first module that is configured to perform a first plurality of operations and a second module that is configured to perform a second plurality of operations, wherein the first plurality of operations and the second plurality of operations comprise one or more packing, unpacking, rounding, shifting, or rotating operations, or one or more combinations thereof;
    the first module that is to perform the first plurality of operations on a part of the input data having a first width smaller than a width of the input data to generate and transmit a first output data to a first input of a multiplexer; and
    the second module that is to perform the second plurality of operations on a remaining part of the input data to generate and transmit a second output data to a second input of the multiplexer, wherein
        the multiplexer selects a shift output for the input data from the first output data and the second output data by using at least a selection control signal determined based in part upon the multiple data types.

2. The apparatus of claim 1, wherein the first module comprises a first shifter module to perform first multiple shift operations and a first rotator module to perform first rotate operations on the part of the input data.

3. The apparatus of claim 1, wherein the second module comprises a second shifter module to perform second multiple shift operations and a second rotator module to perform second rotate operations on the remaining part of the input data.

4. The apparatus of claim 1, wherein the multiple data types include words having multiple word sizes including at least one of a 20-bit word size, a 40-bit word size, and an 80-bit word size.

5. The apparatus of claim 1, wherein the multiple data types include words having multiple word sizes including at least one of an 8-bit word size, a 16-bit word size, a 32-bit word size, and a 64-bit word size, and the first plurality of operations include one or more rotate operations.

6. The apparatus of claim 1, further comprising:
    a first plurality of levels of multiplexers of a first stage located in the first module and configured to perform one or more shifting or rotating operations without saturation; and
    a second plurality of multiplexers of a second stage located in the second module and configured to perform one or more one or more operations with saturation.

7. The apparatus of claim 1, wherein the multiple data types include words having multiple word sizes including at least one of an 8-bit word size, a 16-bit word size, a 32-bit word size, and a 64-bit word size and at least one of a 20-bit word size, a 40-bit word size, and an 80-bit word size.

8. An apparatus for performing shifting and rotating operations on input data, comprising:
    one or more pipeline registers storing the input data that have multiple data types;
    a shifter comprising a first module that is configured to perform a first plurality of operations and a second module that is configured to perform a second plurality of operations, wherein the first plurality of operations and the second plurality of operations comprise one or more packing, unpacking, rounding, shifting, or rotating operations, or one or more combinations thereof;
    the first module located in the shifter and configured to receive the input data and perform the first plurality of operations on the input data to generate first output data without saturation; and
    the second module located in the shifter and configured to receive the first output data from the first module and perform the second plurality of operations on at least a part of the first output data to generate second output data with saturation based at least in part upon a shift amount, wherein
        the apparatus completes processing of the input data with the first module during a first clock cycle and completes processing of the at least the part of the first output data with the second module during a next clock cycle.

9. The apparatus of claim 8, further comprising:
    an inversion module that is to invert signed input data of the input data into unsigned data and transmit at least the unsigned data to the first module or the second module for the processing.

10. The apparatus of claim 8, wherein the first module receives the input data from a plurality of pipeline registers and performs the first plurality of operations during a first clock cycle, and the second module performs the second plurality of operations on the at least the part of the first output data during a next clock cycle immediately after the first clock cycle.

11. The apparatus of claim 8, the first module comprising:
    an unpack block that is to perform one or more unpacking operations on the input data of a first width into unpacked input data of a second width.

12. The apparatus of claim 11, further comprising:
    a data gating block that is to enable either a left shifter or a right shifter according to a shift operation that is to be performed on at least a part of the unpacked input data.

13. The apparatus of claim 11, the first module comprising:
    a left shifter that is to perform a plurality of left shifts to generate left shifted output, wherein the plurality of left shifts correspond to a plurality of shift amounts; and
    a right shifter that is to perform a plurality of right shifts to generate right shifted output, wherein the plurality of right shifts correspond to the plurality of shift amounts.

14. The apparatus of claim 13, the first module comprising:
    a first set of multiplexers that is operatively connected to the right shifter and the left shifter to select the right shifted output or the left shifted output of a first width; and
    a second set of multiplexers that is operatively connected to the right shifter and the left shifter to select the left shifted output or the left shifted output of a second width, wherein
        the first set and the second set performs respective selection of signals based at least in part upon a shift amount signal, multiple partition type signals of the plurality of right shifts, multiple partition type signals of the plurality of left shifts, and one or more saturation signals.

15. The apparatus of claim 8, the second module comprising:

a leading zero detection module that is operatively connected to an input of the apparatus to detect one or more leading zeros of the input data.

16. The apparatus of claim 15, wherein the leading zero detection determines whether a shift amount is within a permissible limit; store the leading zero detection results in a pipeline register or whether a shift amount is within a permissible limit.

17. The apparatus of claim 15, the second module comprising:
a saturation module that is operatively connected to an output of the leading zero detection module to determine whether or not a signal saturation operation is to be performed on the input data based at least in part upon a result generated by the leading zero detection module, wherein
the saturation module that is to receive a saturation vector and a first input data to generate saturated output data based in part upon a saturation amount signal and a partition type signal.

18. The apparatus of claim 15, the second module comprising:
an input data processing module that is to perform a plurality of packing operations and/or a plurality of rounding operations on the at least the part of the first output data.

19. A method of implementing a shifter design with an electronic design automation tool, comprising:
identifying a specification including multiple partition types, which include a plurality of natural partitions of input data, and multiple input data types for the input data received at a shifter design;
generating one or more functions for creating the shifter design by at least an instruction extension compiler;
generating, by using at least the instruction extension compiler, a first stage including first multiple levels of shifters for processing a smaller portion of the input data based at least in part upon the multiple partition types and multiple input data types of the input data; and
generating, by using at least the instruction extension compiler, a second stage including second multiple levels of shifters for processing a remaining portion of the input data having the multiple input data types with the multiple partition types, wherein the smaller portion of the input data comprises a first width that is smaller than a width of the input data.

20. The method of claim 19, the act of generating the first stage comprising:
generating a first circuit block in the first stage of the shifter design to receive the input data having the multiple input data types for processing from one or more pipeline registers; and
generating a first output data by performing, with the first circuit block, at least a first plurality of operations on the input data without performing signal saturation, wherein the signal saturation is performed in the second stage but not in the first stage.

21. The method of claim 20, further comprising:
interconnecting the first circuit block to a second circuit block to transmit the first output data to an input of the second circuit block of the second stage; and
creating a right shifter and a left shifter in the first circuit block in the first stage of the shifter design.

22. The method of claim 21, further comprising:
generating an inversion circuit block to invert signed input data into unsigned input data; and
interconnecting the inversion circuit block to the right shifter and the left shifter to transmit the unsigned input data to the right shifter or the left shifter to perform the processing.

23. The method of claim 20, further comprising:
generating an unpack circuit block that is operatively connected to at least an input of the first circuit block and is to perform one or more unpack operations on the input data of a packed width into unpacked input data of an unpacked width;
identifying multiple partition type signals, one or more shift amount signals, one or more rotate amount signals, or one or more saturation signals; and
generating a first set of multiplexers to select a first output of a first width from a right shifted output of a right shifter or a left shifted output of a left shifter based in part upon the multiple partition type signals.

24. The method of claim 20, further comprising:
creating or identifying a data gating block to enable a right shifter or a left shifter based in part upon at least one of the first plurality of operations or the second plurality of operations.

25. The method of claim 19, the act of generating the second stage comprising:
generating a second circuit block to receive at least first output data as an input; and
generating a second output data by performing, with the second circuit block, at least a second plurality of operations on at least a part of the first output data with signal saturation.

26. The method of claim 25, further comprising:
generating a second set of multiplexers to select between a saturation vector and the at least the part of the first output data based in part upon the multiple partition type signals.

27. The method of claim 25, further comprising:
generating a leading zero detection circuit block to detect one or more leading zeros from the input data;
determining, by using the leading zero detection circuit block, whether a shift amount or a rotate amount is within a permissible limit;
generating a signal saturation circuit block that is configured to determine whether signal saturation operations are to be performed based in part upon results created by the leading zero detection circuit block; and
generating saturated output data by at least performing the signal saturation operations on the at least the part of the first output data by using the saturation vector based in part upon a saturation amount and the multiple partition type signals.

28. The method of claim 25, further comprising:
generating a packing block that performs packing operations or rounding operations on at least saturated output data.

* * * * *